(12) United States Patent
Ichien

(10) Patent No.: US 12,200,355 B2
(45) Date of Patent: Jan. 14, 2025

(54) IMAGE-CAPTURING PLAN CREATING DEVICE, METHOD, AND RECORDING MEDIUM

(71) Applicant: NEC Corporation, Tokyo (JP)

(72) Inventor: Masumi Ichien, Tokyo (JP)

(73) Assignee: NEC CORPORATION, Tokyo (JP)

( * ) Notice: Subject to any disclaimer, the term of this patent is extended or adjusted under 35 U.S.C. 154(b) by 129 days.

(21) Appl. No.: 18/009,823

(22) PCT Filed: Jun. 19, 2020

(86) PCT No.: PCT/JP2020/024135
§ 371 (c)(1),
(2) Date: Dec. 12, 2022

(87) PCT Pub. No.: WO2021/255920
PCT Pub. Date: Dec. 23, 2021

(65) Prior Publication Data
US 2023/0247280 A1 Aug. 3, 2023

(51) Int. Cl.
H04N 23/60 (2023.01)
H04N 23/61 (2023.01)
(Continued)

(52) U.S. Cl.
CPC ............ *H04N 23/64* (2023.01); *H04N 23/61* (2023.01); *H04N 23/617* (2023.01); *H04N 23/80* (2023.01)

(58) Field of Classification Search
CPC ...... H04N 23/64; H04N 23/61; H04N 23/617; H04N 23/80; H04N 23/60; B64G 1/00
See application file for complete search history.

(56) References Cited

U.S. PATENT DOCUMENTS 10,831,200 B2* 11/2020 Iwakura ............... G05D 1/0094
2012/0188372 A1* 7/2012 Ozkul ................... G01C 11/02
348/E7.085
(Continued)

FOREIGN PATENT DOCUMENTS

JP 2007-148650 A 6/2007
JP 4988673 B2 8/2012
(Continued)

OTHER PUBLICATIONS

International Search Report for PCT Application No. PCT/JP2020/024135, mailed on Sep. 15, 2020.
(Continued)

*Primary Examiner* — Hung H Lam

(57) ABSTRACT

An image-capturing plan creating device comprises an image-capturing plan creating unit and a condition establishing unit. The image-capturing plan creating unit is configured to create an image-capturing plan based on image-capturing target information related to image-capturing targets and of image-capturing device information related to image-capturing devices. The condition establishing unit is configured to establish conditions for recreating parts of the created image-capturing plan based on the contents of changes to the created image-capturing plan. The image-capturing plan creating unit is further configured to recreate the parts of the created image-capturing plan based on the established conditions.

9 Claims, 17 Drawing Sheets

(51) Int. Cl.
*H04N 23/617* (2023.01)
*H04N 23/80* (2023.01)

(56) References Cited

U.S. PATENT DOCUMENTS

| | | | |
|---|---|---|---|
| 2015/0009326 A1 | 1/2015 | Saito et al. | |
| 2016/0381348 A1* | 12/2016 | Hayasaka | G06T 1/20 |
| | | | 348/48 |
| 2018/0262674 A1* | 9/2018 | Iwakura | G01C 15/00 |
| 2019/0228573 A1* | 7/2019 | Sen | G01B 17/06 |
| 2020/0020093 A1* | 1/2020 | Frei | G05D 1/0246 |
| 2021/0321036 A1* | 10/2021 | Iwabuchi | G03B 15/00 |

FOREIGN PATENT DOCUMENTS

| | | |
|---|---|---|
| JP | 2012-168739 A | 9/2012 |
| JP | 2014-172555 A | 9/2014 |
| JP | 2015-028759 A | 2/2015 |

OTHER PUBLICATIONS

English translation of Written opinion for PCT Application No. PCT/JP2020/024135, mailed on Sep. 15, 2020.
1 JP Office Action for JP Application No. 2022-531220, mailed on Feb. 20, 2024 with English Translation.

\* cited by examiner

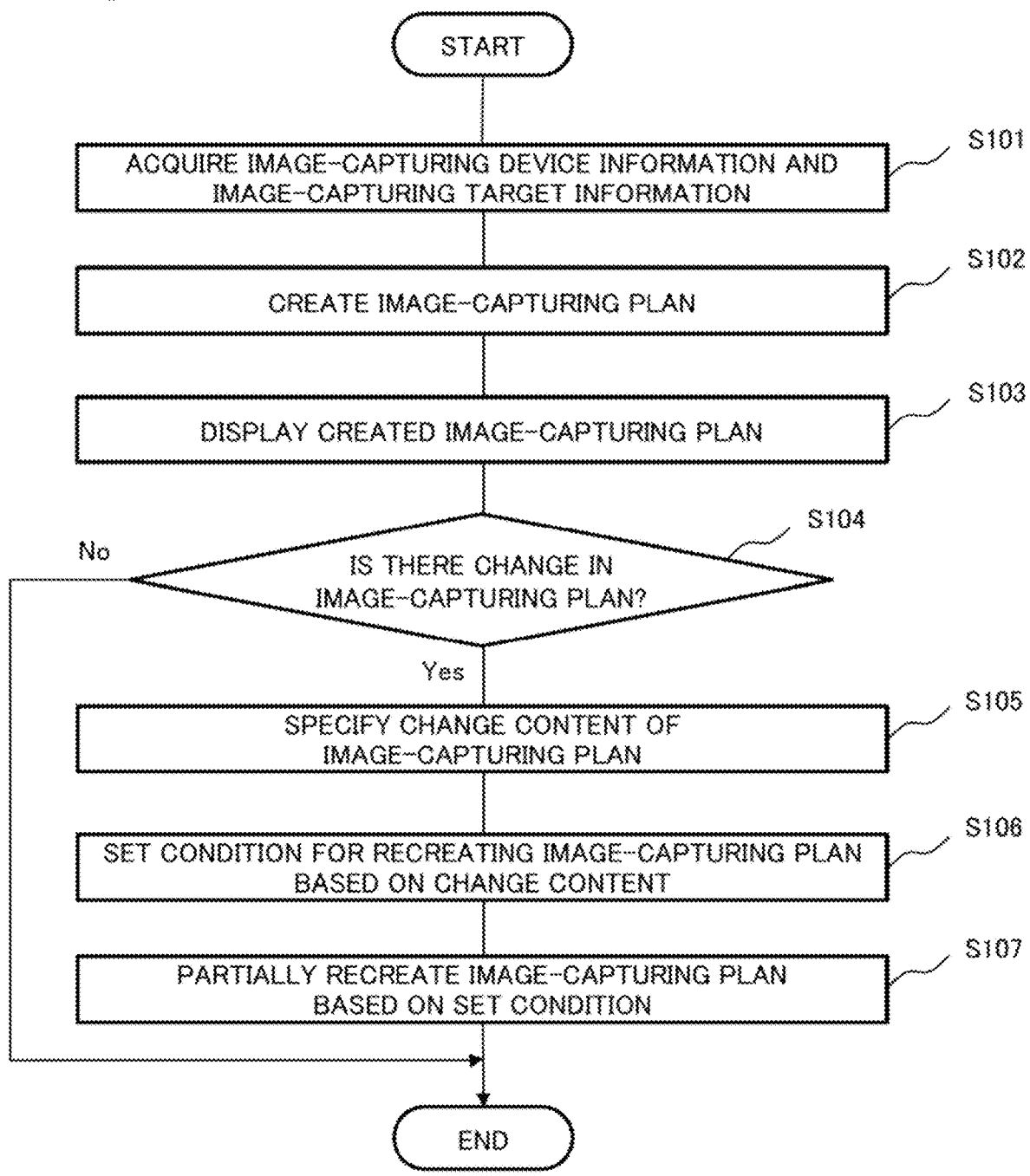

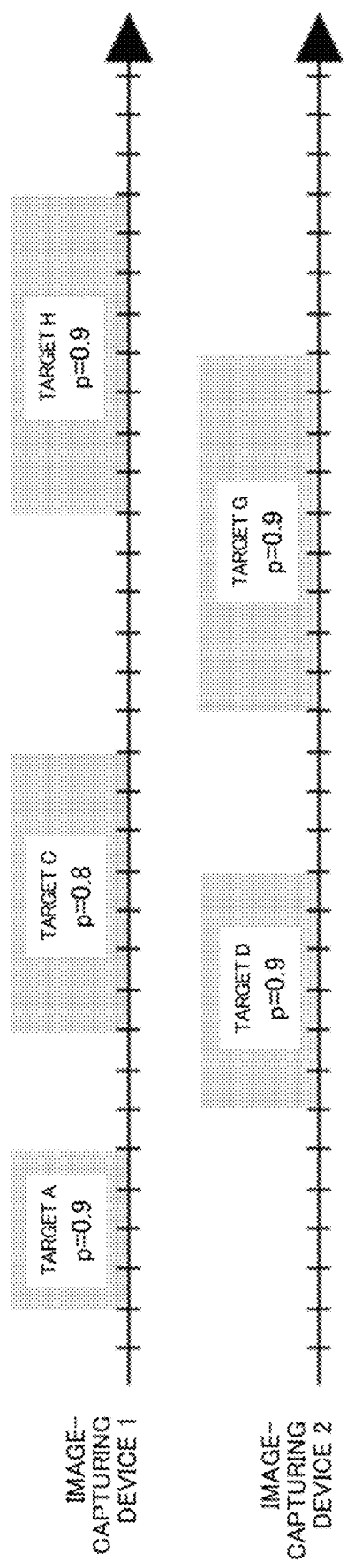

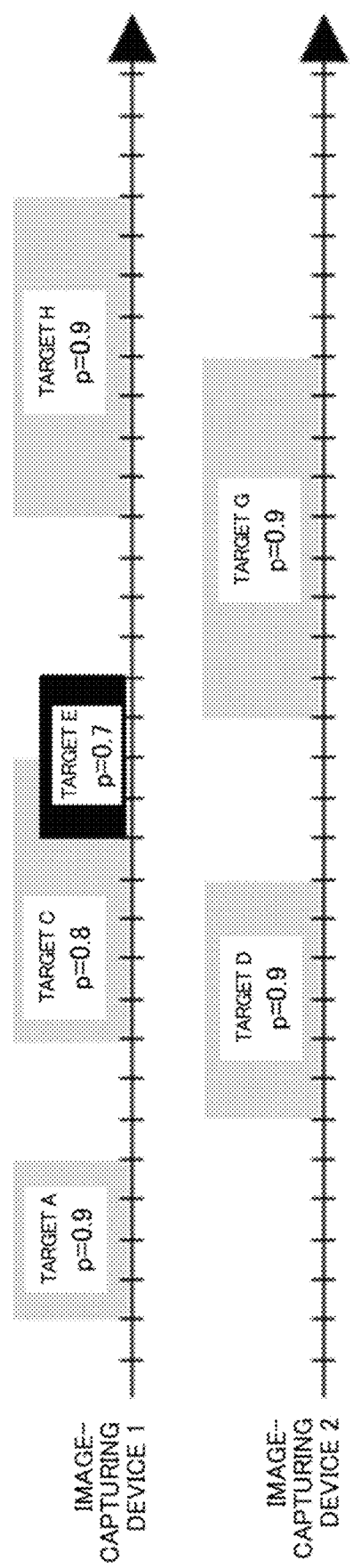

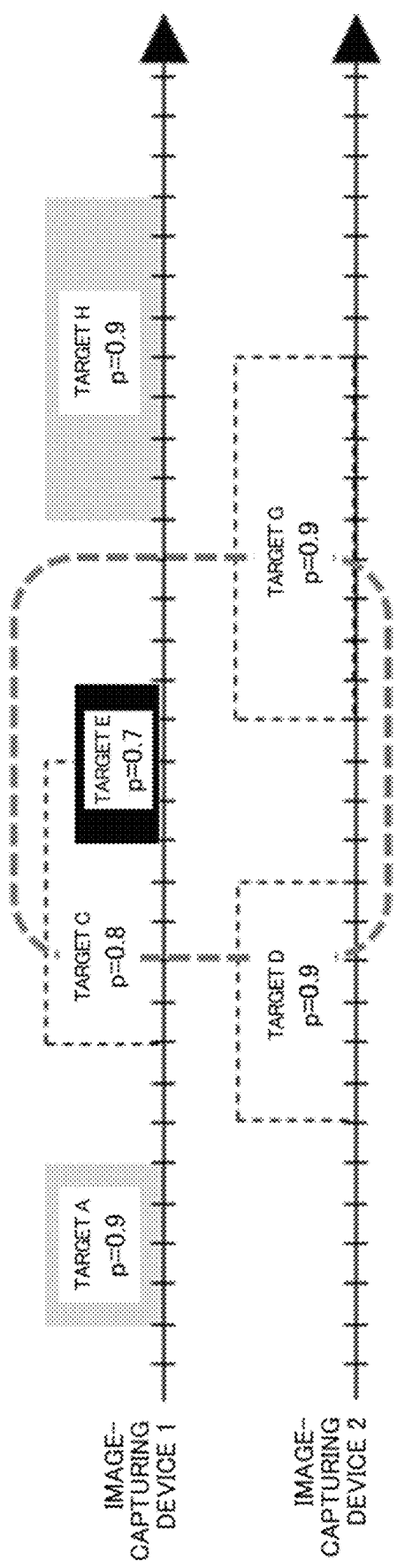

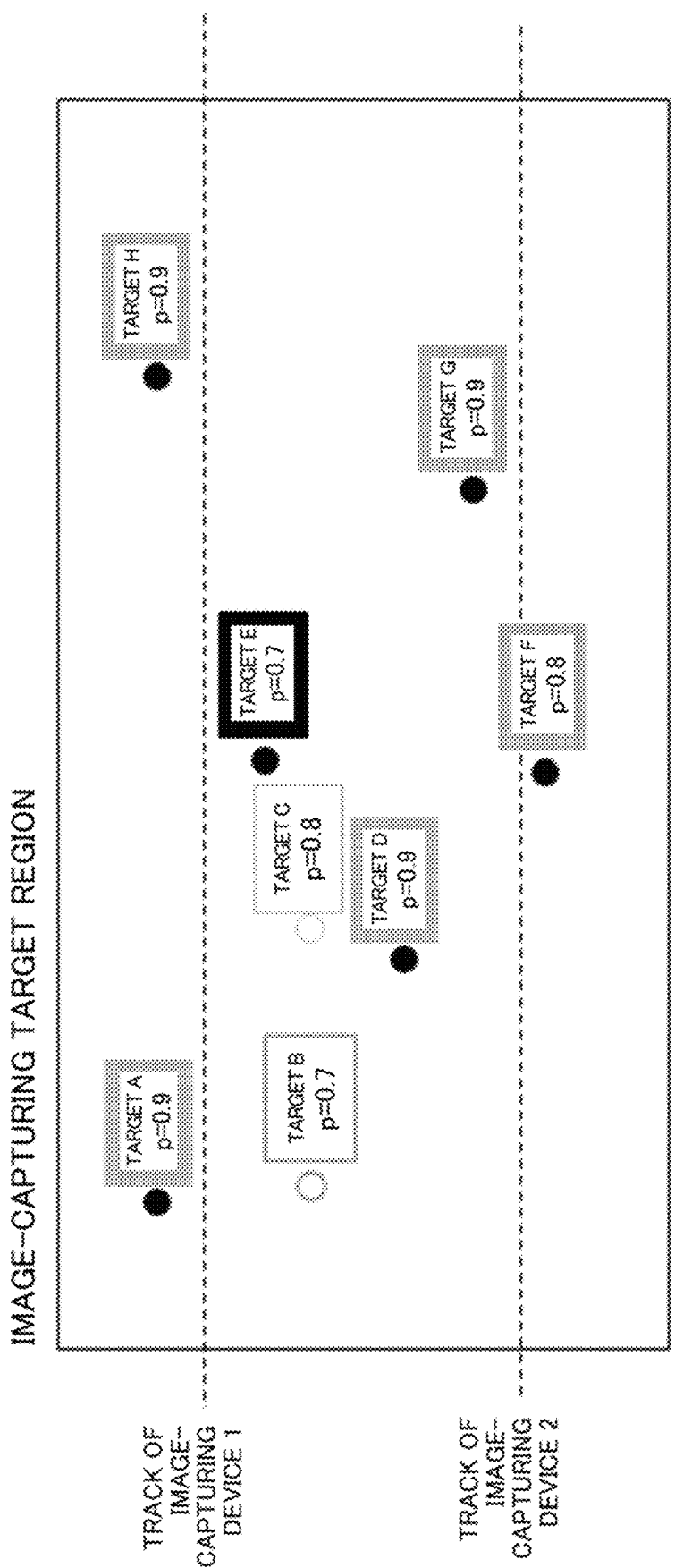

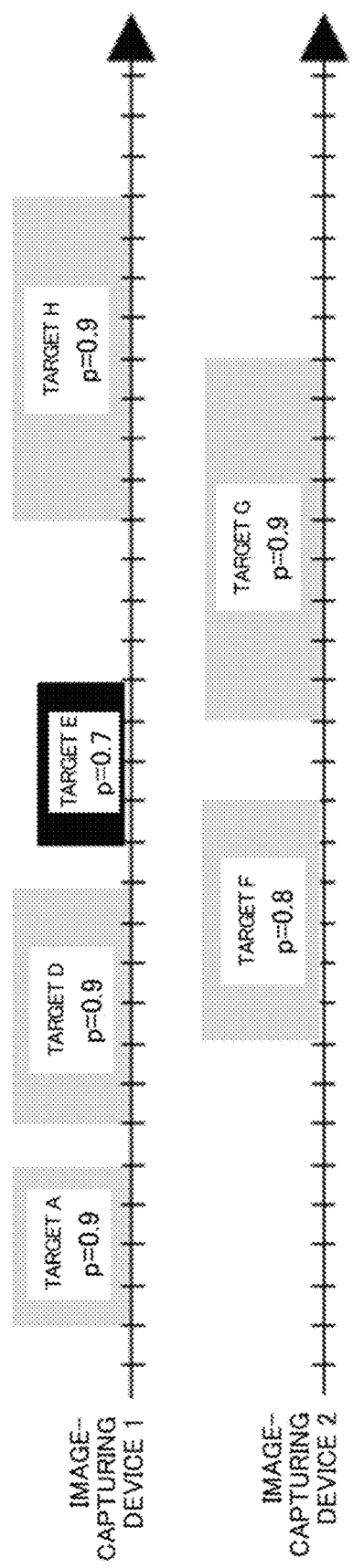

Fig.10

| IMAGE-CAPTURING PLAN SESSION ID | CHANGED IMAGE-CAPTURING TARGET ID | CHANGE TYPE |
|---|---|---|
| 1000 | TARGET A | ADDITIONAL ALLOCATION |
| 1000 | TARGET B | ALLOCATION CANCELLATION |
| ... | ... | ... |
| 1100 | TARGET A | ADDITIONAL ALLOCATION |
| 1100 | TARGET C | ALLOCATION CANCELLATION |
| 1101 | TARGET B | ADDITIONAL ALLOCATION |

IMAGE-CAPTURING PLAN CREATING DEVICE, METHOD, AND RECORDING MEDIUM

This application is a National Stage Entry of PCT/JP2020/024135 filed on Jun. 19, 2020, the contents of all of which are incorporated herein by reference, in their entirety.

TECHNICAL FIELD

The present disclosure relates to an image-capturing plan creating device that creates an image-capturing plan for capturing an image of an image-capturing target with an image-capturing device, and the like.

BACKGROUND ART

In a case where a plurality of objects of image capturing (or subjects for image capturing, image-capture-targets) are imaged using a plurality of image-capturing devices (for example, image-capturing devices mounted on satellites or drones) moving on a preset route, it is necessary to prepare an image-capturing plan. The image-capturing plan considers a characteristic of the image-capturing device, a priority of the image-capturing target, or the like. For example, the image-capturing plan may be prepared based on an experience and an intuition of an operator who operates the image-capturing device, or may be created by a creating device as a scheduling optimization problem. The preparation of the image-capturing plan by the operator takes time, and there is a possibility that it is difficult to cope with a large number of image-capturing requests without always finding efficient allocation of image-capturing targets. On the other hand, the image-capturing plan created by the creating device can deal with a large number of image-capturing requests. However, there is a possibility that an operator who finally determines execution of the image-capturing plan changes the image-capturing plan created by the creating device.

PTL 1 proposes adjusting a plan for an unallocated image-capturing target in such a way that the unallocated image-capturing target can be simultaneously imaged based on an image-capturing range and time of an image-capturing device. In addition, PTL 2 proposes a method for interactively obtaining a solution required by an operator while flexibly adjusting related design parameters in an equipment deployment plan.

CITATION LIST

Patent Literature

[PTL 1] JP 4988673 B2
[PTL 2] JP 2007-148650 A

SUMMARY OF INVENTION

Technical Problem

However, in the proposals of PTL 1 and PTL 2, recreation of a plan by the parameter change is performed for all targets, and it is thus not possible to quickly create an image-capturing plan reflecting the change.

An object of the present disclosure is to provide an image-capturing plan creating device and the like capable of quickly creating an image-capturing plan reflecting a change.

Solution to Problem

An image-capturing plan creating device according to the present disclosure includes: an image-capturing plan creating unit that creates an image-capturing plan based on image-capturing target information regarding image-capturing targets and image-capturing device information regarding an image-capturing device; and a condition setting unit that sets a condition for recreating parts of the created image-capturing plan based on a change content of the created image-capturing plan, in which the image-capturing plan creating unit recreates the parts of the created image-capturing plan based on the set condition.

An image-capturing plan creating method according to the present disclosure includes: creating an image-capturing plan based on image-capturing target information regarding image-capturing targets and image-capturing device information regarding an image-capturing device; setting a condition for recreating parts of the created image-capturing plan based on a change content of the created image-capturing plan; and recreating the parts of the created image-capturing plan based on the set condition.

A recording medium of the present disclosure stores a program. The program creates an image-capturing plan based on image-capturing target information regarding image-capturing targets and image-capturing device information regarding an image-capturing device, sets a condition for recreating parts of the created image-capturing plan based on a change content of the created image-capturing plan, and recreates the parts of the created image-capturing plan based on the set condition.

Advantageous Effects of Invention

According to the present disclosure, it is possible to quickly create an image-capturing plan reflecting a change.

BRIEF DESCRIPTION OF DRAWINGS

FIG. 2 is a diagram illustrating an example of an operation of the image-capturing plan creating device according to the first example embodiment.

FIG. 3B is a diagram illustrating an example of image-capturing times of the image-capturing targets in the created image-capturing plan.

FIG. 4B is a diagram illustrating an example of an image-capturing time of the image-capturing target changed according to the change content.

FIG. 5B is a diagram illustrating the example of setting a condition for recreating the image-capturing plan.

FIG. 6A is a diagram illustrating an example of positions of the image-capturing targets in the recreated image-capturing plan.

FIG. 6B is a diagram illustrating an example of image-capturing times of the image-capturing targets in the recreated image-capturing plan.

FIG. 10 is a diagram illustrating an example of a change history of the image-capturing plan according to the second example embodiment.

EXAMPLE EMBODIMENT

First Example Embodiment

Figure 1:
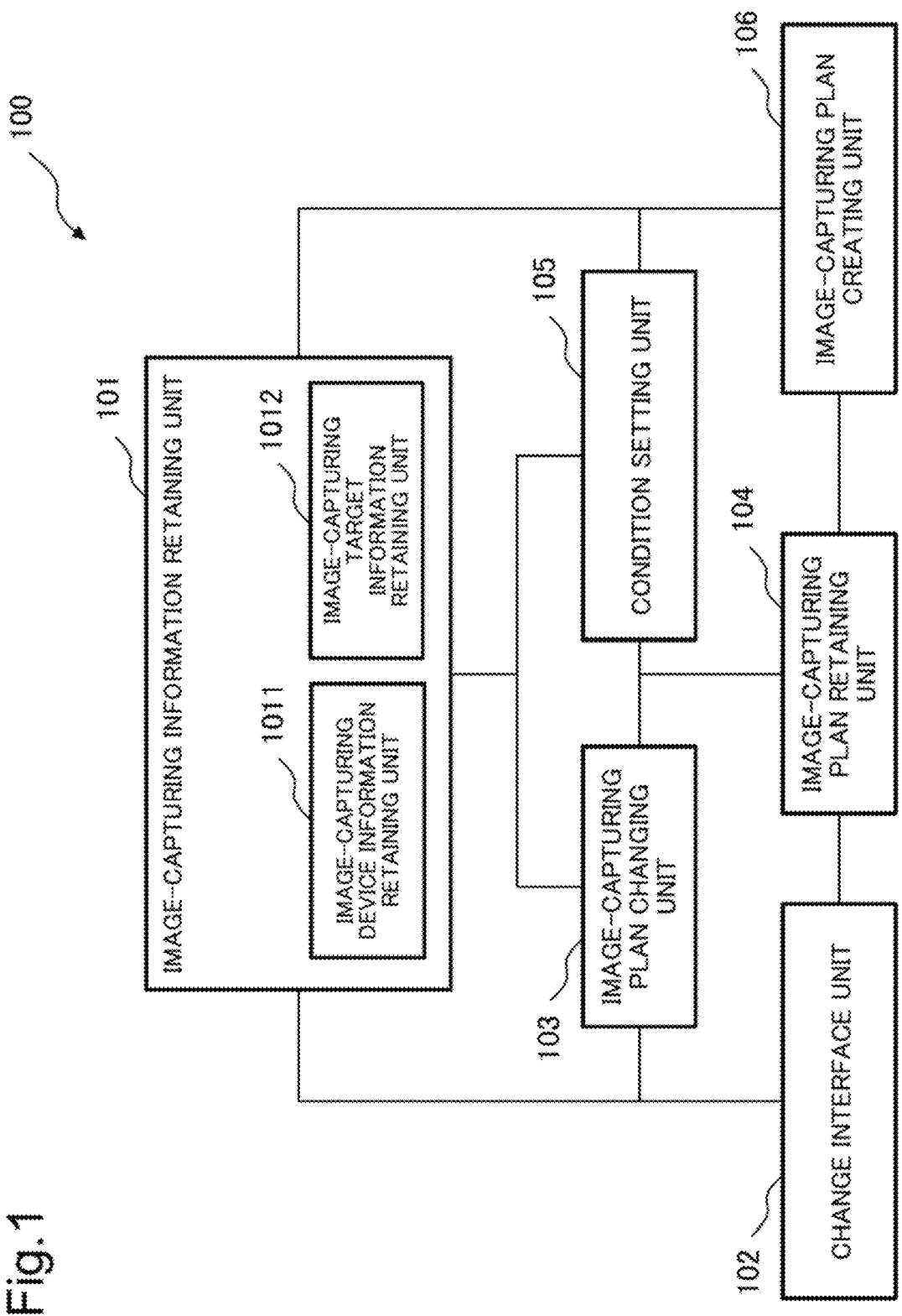
FIG. 1 is a diagram illustrating an example of a configuration of an image-capturing plan creating device according to a first example embodiment.

An image-capturing plan creating device according to a first example embodiment will be described with reference to the drawings. FIG. 1 is a diagram illustrating an example of a configuration of the image-capturing plan creating device according to the first example embodiment. Referring to FIG. 1, an image-capturing plan creating device 100 according to the first example embodiment includes an image-capturing information retaining unit 101, a change interface unit 102, an image-capturing plan changing unit 103, an image-capturing plan retaining unit 104, a condition setting unit 105, and an image-capturing plan creating unit 106.

The image-capturing information retaining unit 101 includes an image-capturing device information retaining unit 1011 and an image-capturing target information retaining unit 1012. The image-capturing information retaining unit 101, the image-capturing device information retaining unit 201, or the image-capturing target information retaining unit 202 is, for example, a storage device such as a memory or a hard disk. The image-capturing information retaining unit 101 retains image-capturing information for creating an image-capturing plan. The image-capturing information includes image-capturing device information regarding information of an image-capturing device, and image-capturing target information regarding information of objects of image capturing (or subjects for image capturing, image-capture-targets).

The image-capturing device information retaining unit 201 retains the image-capturing device information. The image-capturing device information includes an image-capturing type (a camera, a radar, or the like) of the image-capturing device, an image-capturing range of the image-capturing device, a movement route of the image-capturing device, control information of the image-capturing device, and the like. The image-capturing target information retaining unit 202 retains the image-capturing target information. The image-capturing target information includes position information of a place where the image-capturing target is to be imaged, a priority of the image-capturing target, and the like.

The change interface unit 102 is an operation device for the operator to input a change content of the image-capturing plan. The change content of the image-capturing plan includes an identifier of a changed image-capturing target, and a change type such as addition, deletion, or order change of an image-capturing target. The change interface unit 102 is, for example, a graphical interface in which an image-capturing target region, an image-capturing device, and an image-capturing target are displayed on a display (not illustrated), and through which the operator inputs the change content of the image-capturing plan. The change interface unit 102 is not limited to the graphical interface, and may be an input device that displays related information in characters and inputs the change content of the image-capturing plan by a command.

The image-capturing plan changing unit 103 interprets the change content input by the change interface unit 102 and reflects the change in the image-capturing plan. The image-capturing plan retaining unit 104 retains the created image-capturing plan or the changed image-capturing plan. A data format of the image-capturing plan retained in the image-capturing plan retaining unit 104 is, for example, a text-based format, a binary format, or the like.

The condition setting unit 105 sets a condition for recreation by the image-capturing plan creating unit 106 based on the changed image-capturing plan.

The image-capturing plan creating unit 106 creates the image-capturing plan based on the image-capturing device information and the image-capturing target information retained in the image-capturing information retaining unit 101. For example, the image-capturing plan is created as an image-capturing plan optimization problem by using a mathematical optimization-based creation method or a heuristic-based creation method. The image-capturing plan creating unit 106 recreates the image-capturing plan based on the image-capturing device information, the image-capturing target information, and the condition set by the condition setting unit 105.

Next, an operation of the image-capturing plan creating device 100 according to the first example embodiment will be described with reference to the drawings. FIG. 2 is a diagram illustrating an example of the operation of the image-capturing plan creating device 100 according to the first example embodiment. The image-capturing plan creating device 100 receives an image-capturing request. The image-capturing plan creating unit 106 acquires the image-capturing target information from the image-capturing information retaining unit 101 based on the image-capturing request (Step S101). Next, the image-capturing plan creating unit 106 creates an image-capturing plan (Step S102), and stores the created image-capturing plan in the image-capturing plan retaining unit 104.

Hereinafter, a description will be given using an example in which an image-capturing plan for targets A to H in an image-capturing target region is created by two image-capturing devices. An image-capturing time required for each image-capturing target and image-capturing priorities of the image-capturing targets A to H are set in advance. The image-capturing priority is represented by a p value, and the larger the p value, the higher the priority. For example, the p value is determined within a range of $0.0 < p < 1.0$. A possible range of the p value is not limited to a value equal to or more than 0.0 and equal to or less than 1.0, and is arbitrary. The smaller the p value, the higher the image-capturing priority. For example, the image-capturing priority is set in advance when the image-capturing request is registered in the image-capturing information retaining unit 101.

In the image-capturing plan creating unit 106, processing of allocating an image-capturing target to an image-capturing device may be performed by, for example, a heuristic method, and may be performed by a greedy method in which image-capturing targets are allocated to an allocatable image-capturing device in descending order of priority.

Figure 3A:
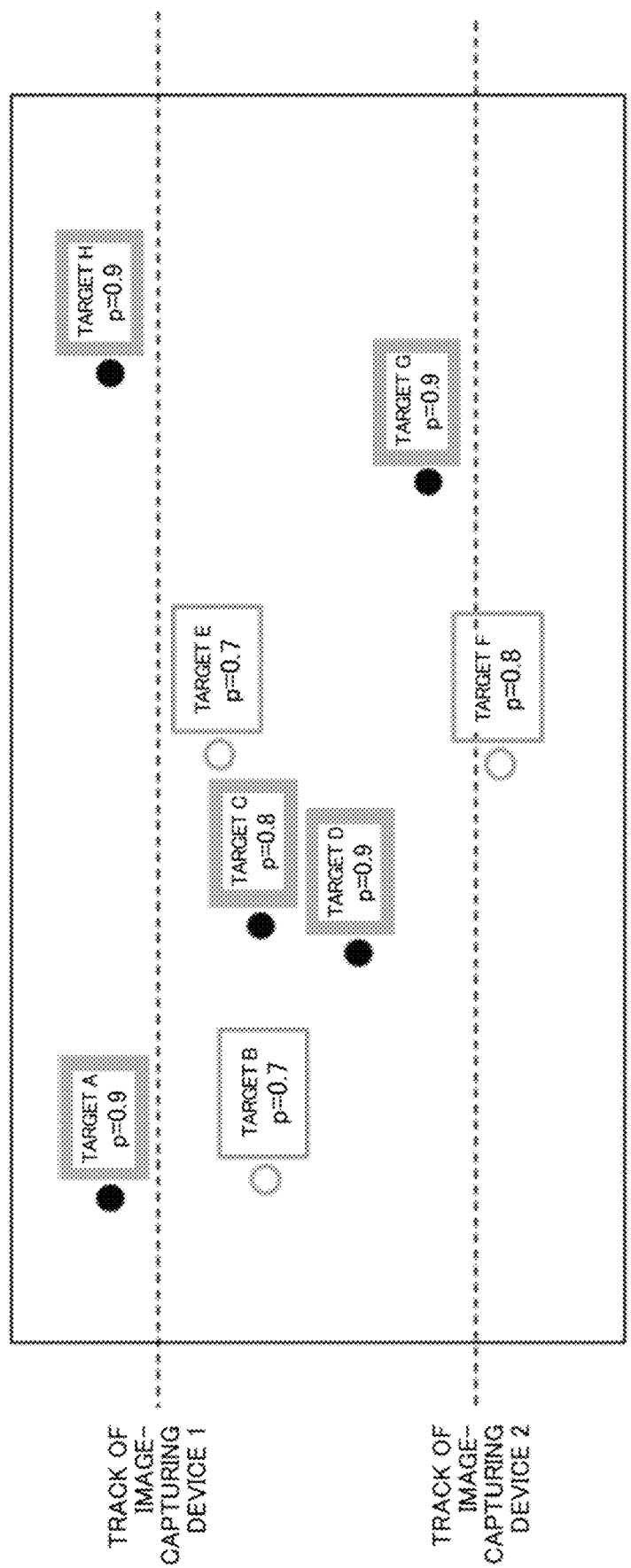
FIG. 3A is a diagram illustrating an example of positions of image-capturing targets in a created image-capturing plan.

FIG. 3A is a diagram illustrating an example of positions of the image-capturing targets in the created image-capturing plan. FIG. 3B is a diagram illustrating an example of image-capturing times of the image-capturing targets in the created image-capturing plan. FIG. 3A is an example of a result of creating the image-capturing plan by the greedy method. In the image-capturing target group (image-capturing targets A to H), image-capturing targets with higher priorities are allocated to image-capturing devices 1 and 2. Meanwhile, in a case where image-capturing times of a plurality of image-capturing targets overlap for one image-capturing device, an image-capturing target with a higher priority is preferentially allocated to the image-capturing device. For example, the targets B, E, and F are not allocated to the image-capturing plan (non-allocatable state).

Whether or not image capturing of a plurality of image-capturing targets is possible may be determined not only by overlapping of image-capturing times but also by a restriction on image capturing, for example, a posture change time of the image-capturing device. The posture change time is, for example, a time taken to reverse an image-capturing direction in a case where the next image-capturing target is located on the opposite side of the image-capturing direction. Furthermore, in a case where there are a plurality of image-capturing devices, an image-capturing target may be allocated to an image-capturing device closest to the image-capturing target by comparing distances between the image-capturing target and the image-capturing devices.

Next, the change interface unit 102 acquires the image-capturing plan stored in the image-capturing plan retaining unit 104. The change interface unit 102 displays the created image-capturing plan (Step S103), and the operator confirms the displayed image-capturing plan.

In a case where there is no change in the image-capturing plan (No in Step S104), the processing of changing the image-capturing plan ends. On the other hand, in a case where there is a change in the image-capturing plan (Yes in Step S104), the change interface unit 102 receives an image-capturing plan change command from the operator, and the image-capturing plan changing unit 103 interprets the image-capturing plan change command input from the change interface unit 102 and specifies the change content (Step S105).

Figure 4A:
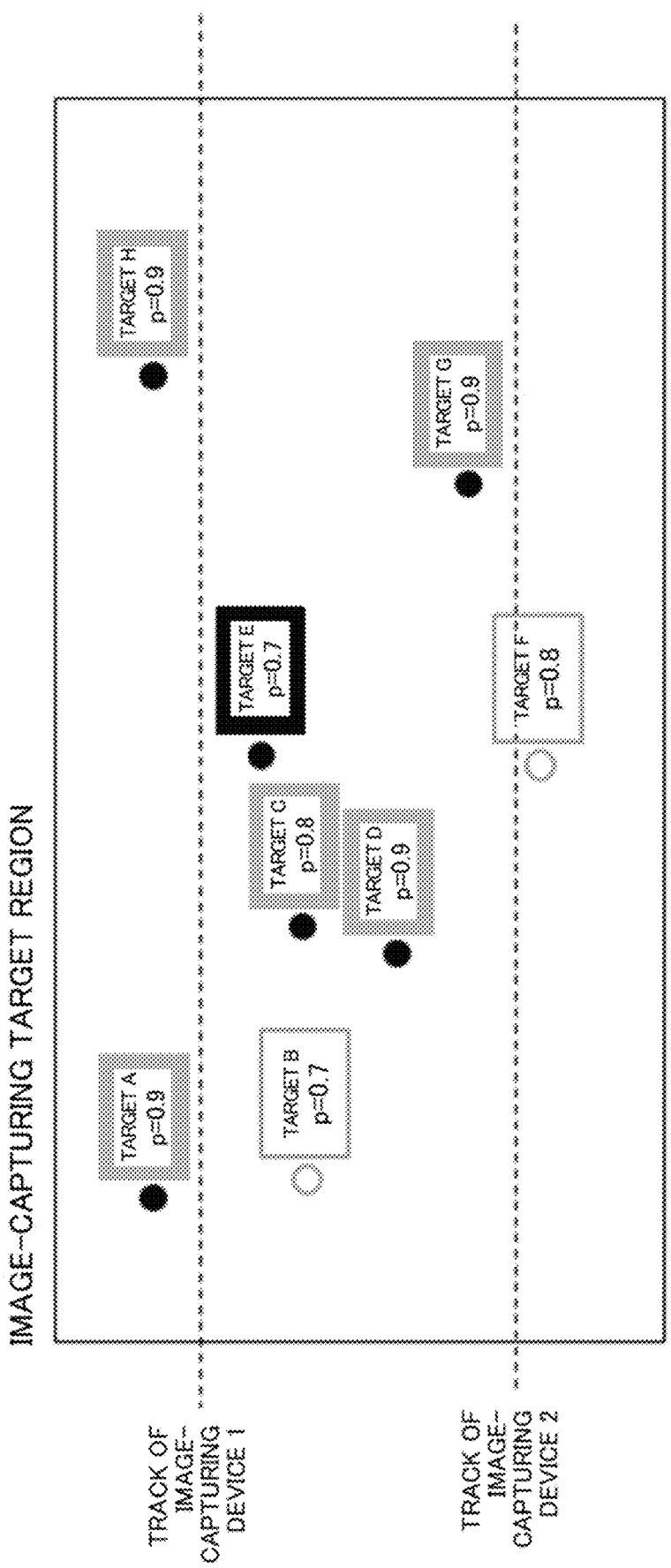
FIG. 4A is a diagram illustrating an example of a position of the image-capturing target changed according to a change content.

FIG. 4A is a diagram illustrating an example of a position of the image-capturing target changed according to the change content. FIG. 4B is a diagram illustrating an example of an image-capturing times of the image-capturing target changed according to the change content. In FIGS. 4A and 4B, additional allocation, in which the target E is added as an image-capturing target, is applied as the change content. The target E is changed to be forcibly allocated in the image-capturing plan by the additional allocation. The number of changed image-capturing targets is one in the example of FIGS. 4A and 4B, but a plurality of image-capturing targets may be simultaneously changed.

Figure 5A:
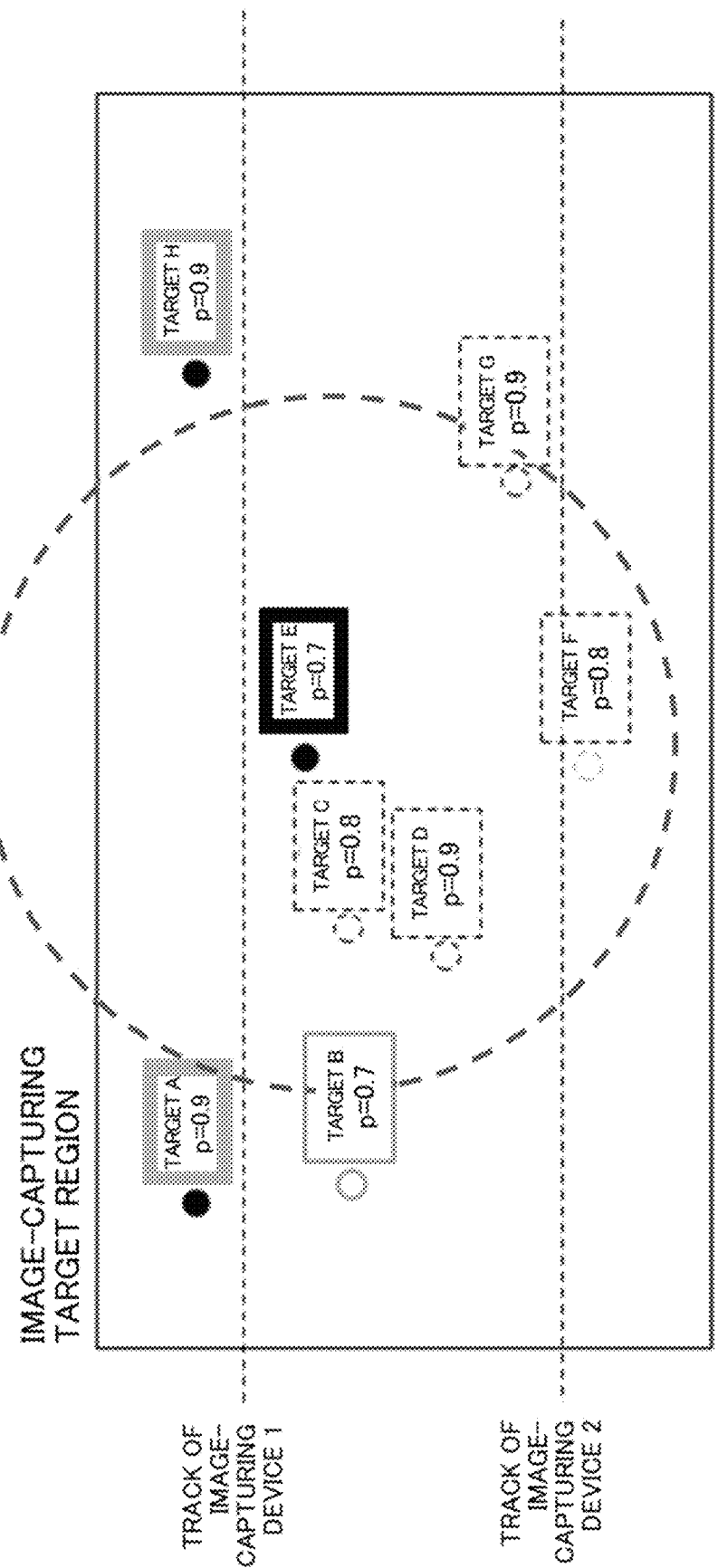
FIG. 5A is a diagram illustrating an example of setting a condition for recreating the image-capturing plan.

Next, the condition setting unit 105 sets a condition for recreating the image-capturing plan based on the change content (Step S106). FIGS. 5A and 5B are diagrams illustrating an example of setting the condition for recreating the image-capturing plan.

As an influence of the forcible allocation of the image-capturing target, there is a possibility that image capturing of image-capturing targets becomes impossible due to overlapping of image-capturing times or the like, and allocation of image-capturing targets becomes possible due to a change in allocation order and time. The condition setting unit 105 cancels image-capturing allocation of an image-capturing target related to the changed image-capturing target in order to match the image-capturing plan. Examples of a method of determining the relevance include a method of determining an image-capturing target within a predetermined distance from the changed image-capturing target (image-capturing targets within a broken line circle in FIG. 5A), an image-capturing target whose image-capturing time is close to an image-capturing time of the changed image-capturing target (image-capturing targets within a broken line rectangle in FIG. 5B), or the like.

In order to more efficiently implement an image-capturing plan that the operator can be satisfied with, a plurality of patterns for an image-capturing target related to the changed image-capturing target may be set, and a plurality of conditions for recreating the image-capturing plan using the patterns may be set.

Next, the image-capturing plan creating unit 106 recreates parts of the created image-capturing plan based on the set condition (Step S107).

Then, the change content is reflected, allocation of the image-capturing target related to the changed image-capturing target is canceled, and the image-capturing plan is recreated using the set condition. An example of the recreated image-capturing plan will be described with reference to FIGS. 5A, 5B, 6A, and 6B. FIG. 6A is a diagram illustrating an example of positions of the image-capturing targets in the recreated image-capturing plan. FIG. 6B is a diagram illustrating an example of image-capturing times of the image-capturing targets in the recreated image-capturing plan.

First, the image-capturing plan creating unit 106 allocates the image-capturing device 1 whose trajectory is close to the target E (additional allocation). Next, the image-capturing plan creating unit 106 provisionally allocates the target D and the target G having a priority of p value=0.9 to the allocatable image-capturing device 2. Subsequently, the image-capturing plan creating unit 106 attempts to allocate the target C and the target F having a priority of p value=0.8 to the image-capturing device 1 or 2. However, the image-capturing device 1 or 2 is not allocated because the image-capturing time of the target C overlaps with that of the target E, and the image-capturing time of the target F overlaps with that of the target G. Therefore, in a case where the target D and the target G are allocated to the image-capturing device 2, the target C and the target F are not allocated.

Next, as illustrated in FIGS. 6A and 6B, the image-capturing plan creating unit 106 temporarily allocates the target D to the image-capturing device 1 and temporarily allocates the target G to the image-capturing device 2. Subsequently, the image-capturing plan creating unit 106 provisionally allocates the target F to the image-capturing device 2. In a case where the target F is allocated to the image-capturing device 2, the target C is not allocated. The target C can be allocated to the image-capturing device 2 instead of the target F. In this case, the target F is not allocated.

The image-capturing plan creating unit 106 recreates the image-capturing plan by allocation to the image-capturing device 1 or 2 illustrated in FIGS. 6A and 6B to which more image-capturing targets having a priority p value=0.8 can be allocated. In the recreation of the image-capturing plan, since only an image-capturing target in the vicinity of the image-capturing target whose allocation has been forcibly changed in the image-capturing plan is an allocation change consideration target, a time taken to create the image-capturing plan is shorter than in a case of creating the entire image-capturing plan. Once the partially changed image-capturing plan is recreated, the image-capturing plan creating unit 106 stores the result in the image-capturing plan retaining unit 104.

Effects of First Example Embodiment

With the image-capturing plan creating device 100 of the first example embodiment, it is possible to quickly create an image-capturing plan reflecting a plan change. The condition setting unit 105 sets a condition for recreating parts of the created image-capturing plan based on the change content of the created image-capturing plan. This is because the image-capturing plan creating unit 106 recreates parts of the created image-capturing plan based on the set condition. As a result, even in a case where the number of image-capturing devices and the number of image-capturing targets increase, it is possible to quickly create the image-capturing plan.

Second Example Embodiment

Next, an image-capturing plan creating device 100 according to a second example embodiment will be described with reference to the drawings. The image-capturing plan creating device 100 according to the second example embodiment has a form for modeling a pattern in which an operator changes a created image-capturing plan and reflecting the change model in the creation of the image-capturing plan, thereby reducing the effort of the operator in changing the created image-capturing plan.

Figure 7:
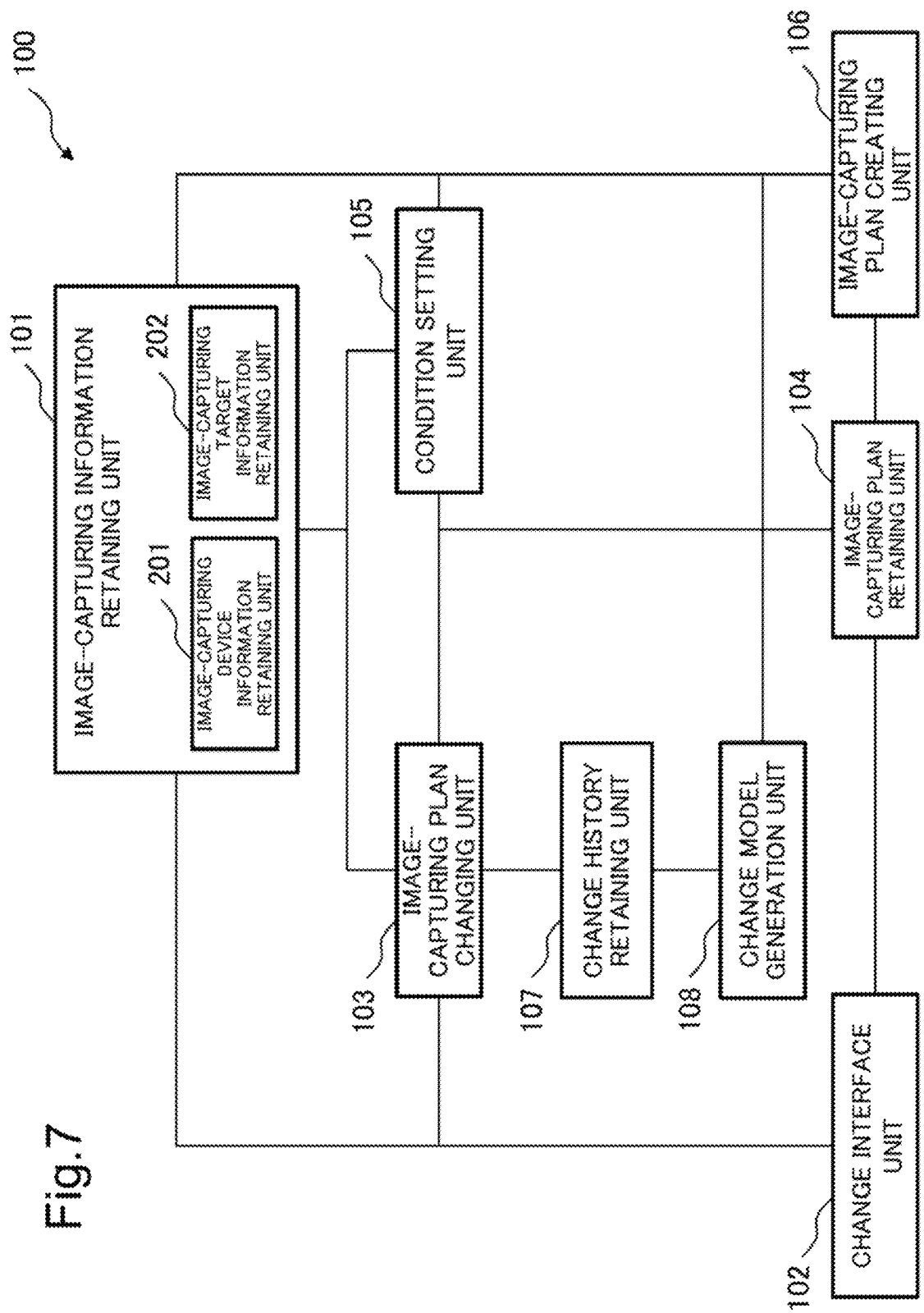
FIG. 7 is a diagram illustrating an example of a configuration of an image-capturing plan creating device according to a second example embodiment.

FIG. 7 is a diagram illustrating an example of a configuration of the image-capturing plan creating device according to the second example embodiment. Referring to FIG. 7, in the second example embodiment, a change history retaining unit 107 and a change model generation unit 108 are added to the configuration of the image-capturing plan creating device 100 according to the first example embodiment.

In the second example embodiment, configurations and operations of an image-capturing information retaining unit 101, a change interface unit 102, and an image-capturing plan retaining unit 104 are similar to those in the first example embodiment.

An image-capturing plan changing unit 103 interprets an image-capturing plan change command input by the change interface unit 102 and specifies a change content. The image-capturing plan changing unit 103 reflects the change in accordance with a data format of the image-capturing plan, and stores the change content of the created image-capturing plan in the change history retaining unit 107. Examples of the change content include a changed image-capturing target identifier (ID) and a change type.

The change model generation unit 108 generates the change model of the pattern of the change of the image-capturing plan by the operator based on a change history indicating the past change content of the created image-capturing plan. The change model is generated by classifying the change patterns based on, for example, a preset condition (such as the position or priority of the image-capturing target). Alternatively, the change model may be generated by training a neural network. Examples of the form of the change model include classified expression and numerical expression such as a change probability of each image-capturing target.

FIG. 10 is a diagram illustrating an example of the change history of the image-capturing plan according to the second example embodiment. The change history of the image-capturing plan illustrated in FIG. 10 includes, for example, an image-capturing plan session ID, a changed image-capturing target ID, and a change type. The image-capturing plan session ID is an identifier for identifying an image-capturing plan session. The image-capturing plan session represents a period from start of image capturing to end of image capturing in an image-capturing target region. The changed image-capturing target ID is an identifier for identifying the changed image-capturing target.

The change history is not limited to the image-capturing plan session ID, the changed image-capturing target ID, and the change type. For example, the change history may be an identifier of an image-capturing device related to the change, an identifier of an image-capturing target located within a predetermined distance from the changed image-capturing target, a time stamp of change processing, or an identifier for identifying a person who has changed the image-capturing plan.

The change model is expressed by a change probability of each image-capturing target in a plurality of past image-capturing plan sessions. For example, it is assumed that the target A has been additionally allocated 20 times in the latest 100 image-capturing plan sessions. In this case, the probability that the target A is additionally allocated is $P_{add}(A)$ =20/100=0.2. Then, a parameter at the time of creating the image-capturing plan is changed based on the probability value. In a case where there is a change, it is interpreted that there is a difference between a set priority and a priority actually felt by the operator at the time of registering the image-capturing request.

For example, a method of newly updating the priority p(A) of the target A with a priority-increase upper limit $p_{inc}$ which is an upper limit of an increment of the priority when increasing the priority in such a way that $p(A) \leftarrow p(A) + p_{inc} \times P_{add}(A)$ and changing the priority in advance is considered. By changing the priority, the priority of the image-capturing target that is additionally allocated a number of times by the operator is corrected to be high. The image-capturing target with the changed priority is allocated more preferentially. Further, it can be expected that the effort of the operator in changing is reduced. In addition, it is also possible to cope with reducing the priority by newly updating p(A) with a priority-decrease lower limit value $p_{dec}$ which is a lower limit of an increment (negative value) of the priority when decreasing the priority in such a way that $p(A) \leftarrow p(A) + p_{dec} \times P_{add}(A)$. A parameter change before the creation of the image-capturing plan may be made by a method of temporarily changing the parameter before the creation, a method of updating master data stored in a database or the like, or the like.

Figure 8:
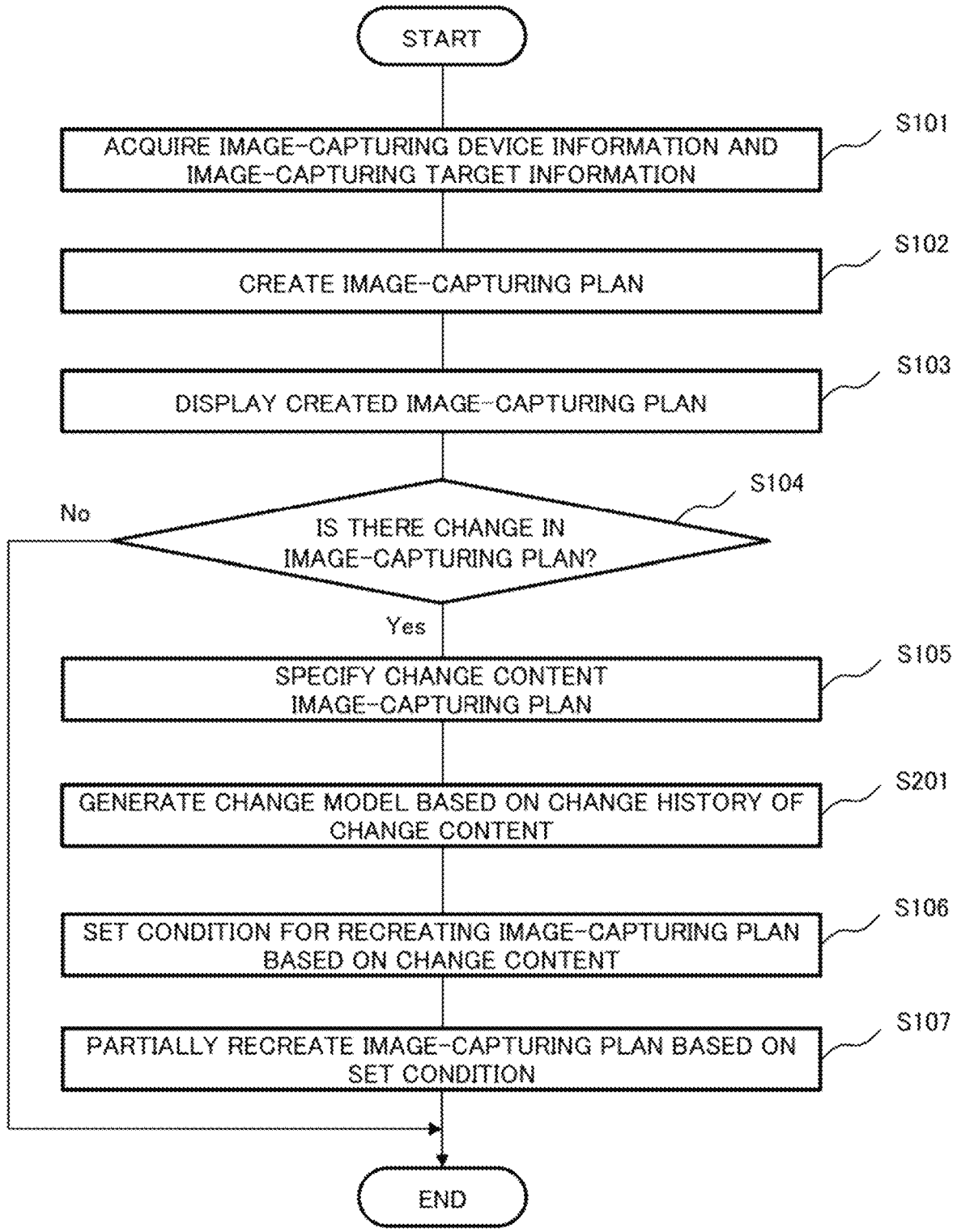
FIG. 8 is a diagram illustrating an example of an operation of the image-capturing plan creating device according to the second example embodiment.

Next, an operation of the image-capturing plan creating device 100 according to the second example embodiment will be described with reference to the drawings. FIG. 8 is a diagram illustrating an example of the operation of the image-capturing plan creating device according to the second example embodiment. Steps S101 to S107 illustrated in FIG. 8 are the same as those in the first example embodiment. In FIG. 8, Step S201 related to generation of the change model is added between Step S105 and Step S106.

The image-capturing plan changing unit 103 interprets an image-capturing plan change command input by the change interface unit 102 and specifies the change content (Step S105). The image-capturing plan changing unit 103 reflects the change in accordance with a data format of the image-capturing plan, and stores the change content of the created image-capturing plan in the change history retaining unit 107.

The change model generation unit 108 generates the change model of the pattern of the change of the image-capturing plan by the operator based on the change history indicating the past change content of the created image-capturing plan (Step S201). The generated change model is temporarily retained in the change model generation unit 108. In the above example, the step of generating the change model is added between Step S105 and Step S106, but the present disclosure is not limited thereto. For example, after Step S105 in which the change content of the image-capturing plan is specified, Step S201 may be added after Step S107.

The change model is generated by classifying the change patterns based on, for example, a preset condition (such as the position or priority of the image-capturing target). Alternatively, the change model may be generated by training a neural network. Examples of the form of the change model include classified expression and numerical expression such as a change probability of each image-capturing target.

Figure 9:
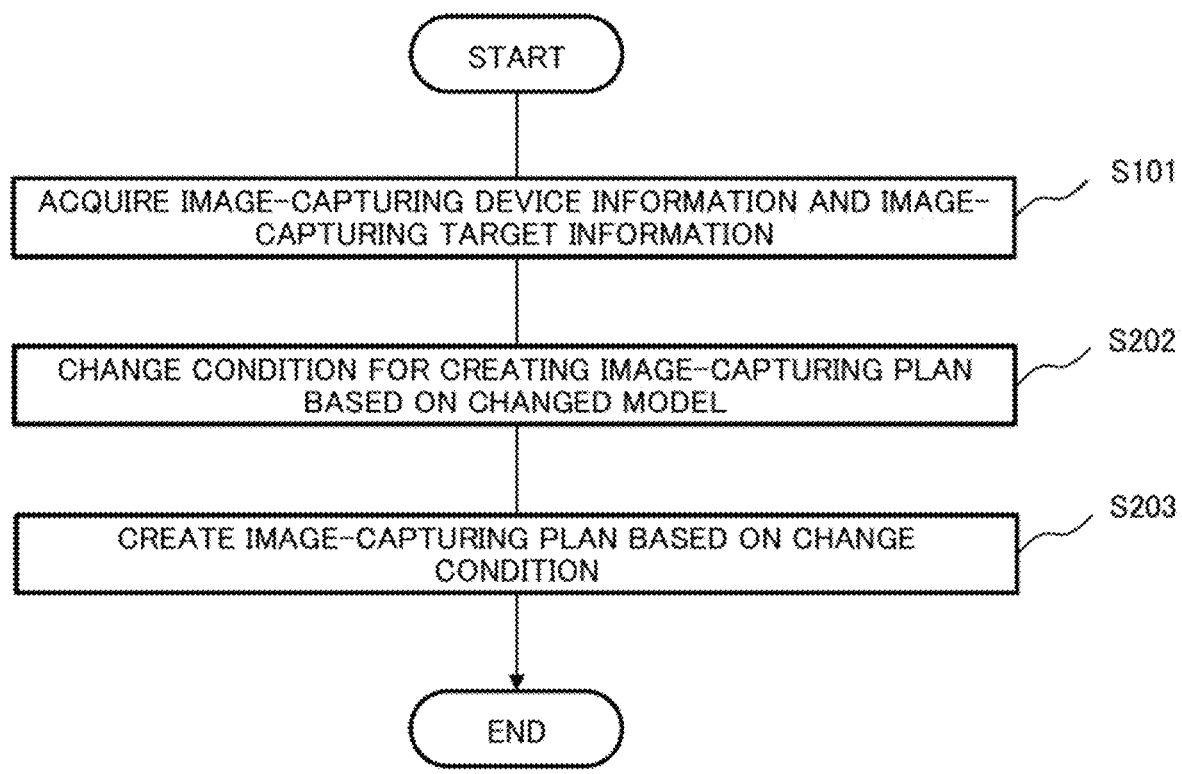
FIG. 9 is a diagram illustrating an example of a processing flow of modifying and recreating an image-capturing plan according to the second example embodiment.

FIG. 9 is a diagram illustrating an example of processing of creating the image-capturing plan using the change model according to the second example embodiment. Step S101 illustrated in FIG. 9 is similar to that of the first example embodiment.

The image-capturing plan creating unit 106 changes a condition (parameter) related to allocation of an image-capturing device and an image-capturing target for creating the image-capturing plan based on the change model by referring to the change model generation unit 108 (Step S202). The image-capturing plan creating unit 106 creates the image-capturing plan based on the changed condition (Step S203).

Effects of Second Example Embodiment

With the image-capturing plan creating device 100 of the second example embodiment, it is possible to quickly create an image-capturing plan reflecting a plan change. The condition setting unit 105 sets a condition for recreating parts of the created image-capturing plan based on the change content of the created image-capturing plan. This is because the image-capturing plan creating unit 106 recreates parts of the created image-capturing plan based on the set condition.

Furthermore, in the second example embodiment, the image-capturing plan creating unit 106 changes a condition (parameter) related to allocation of an image-capturing device and an image-capturing target for creating the image-capturing plan based on the change model by referring to the change model generation unit 108. The image-capturing plan creating unit 106 creates the image-capturing plan based on the changed condition. Therefore, with the image-capturing plan creating device 100 of the second example embodiment, the change frequency of the created image-capturing plan is reduced, and the image-capturing plan can be created more quickly.

Third Example Embodiment

Figure 11:
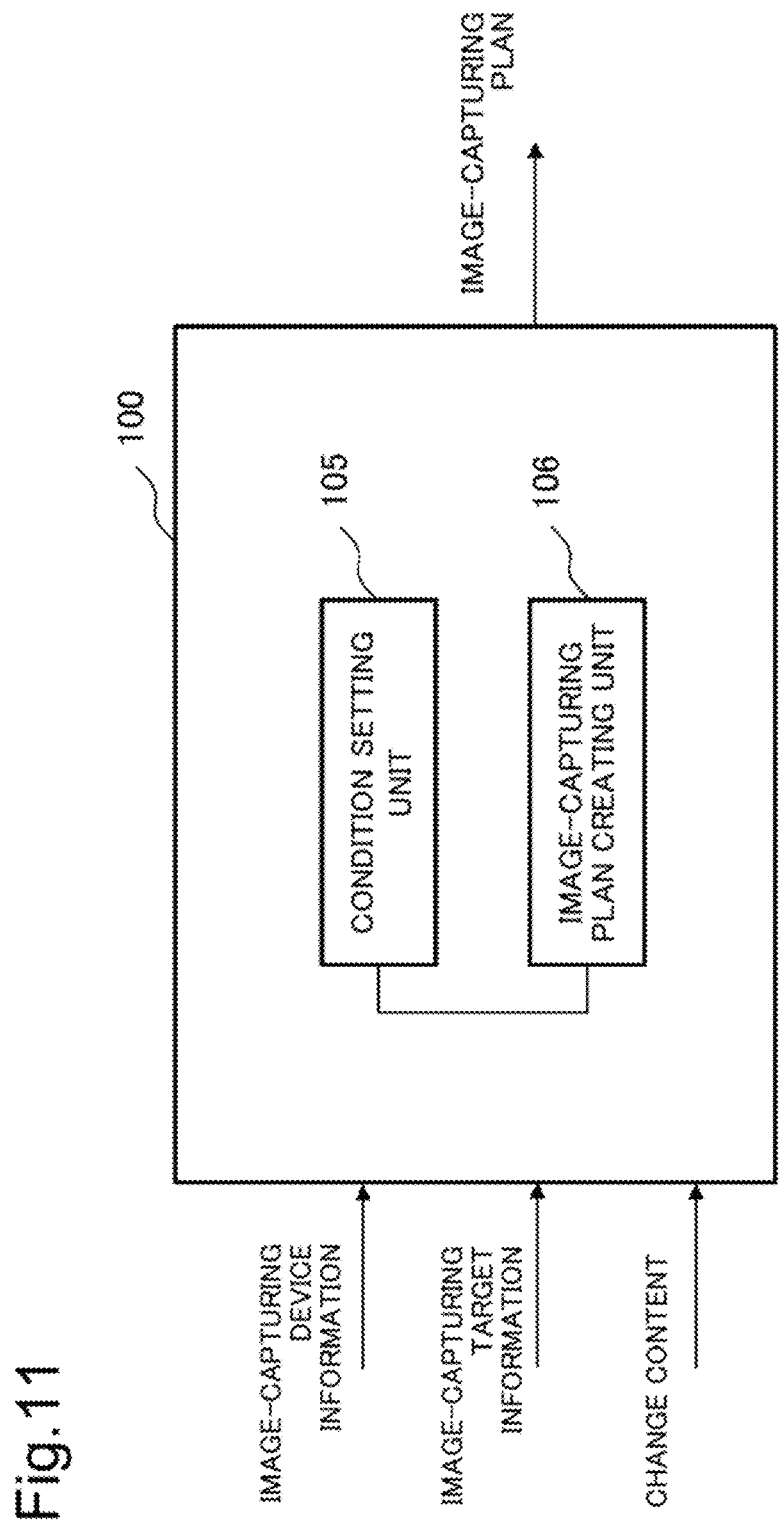
FIG. 11 is a diagram illustrating an example of a configuration of an image-capturing plan creating device according to a third example embodiment.

Next, an image-capturing plan creating device according to a third example embodiment will be described with reference to the drawings. FIG. 11 is a diagram illustrating an example of a configuration of the image-capturing plan creating device according to the third example embodiment. An image-capturing plan creating device 100 according to the third example embodiment illustrated in FIG. 11 includes a condition setting unit 105 and an image-capturing plan creating unit 106.

The image-capturing plan creating unit 106 of the image-capturing plan creating device 100 receives the image-capturing target information and the image-capturing device information. The image-capturing plan creating unit 106 creates the image-capturing plan based on the image-capturing target information and the image-capturing device information. The condition setting unit 105 receives the change content of the created image-capturing plan. The condition for recreating parts of the created image-capturing plan is set based on the change content. The image-capturing plan creating unit 106 recreates parts of the created image-capturing plan based on the set condition.

Figure 12:
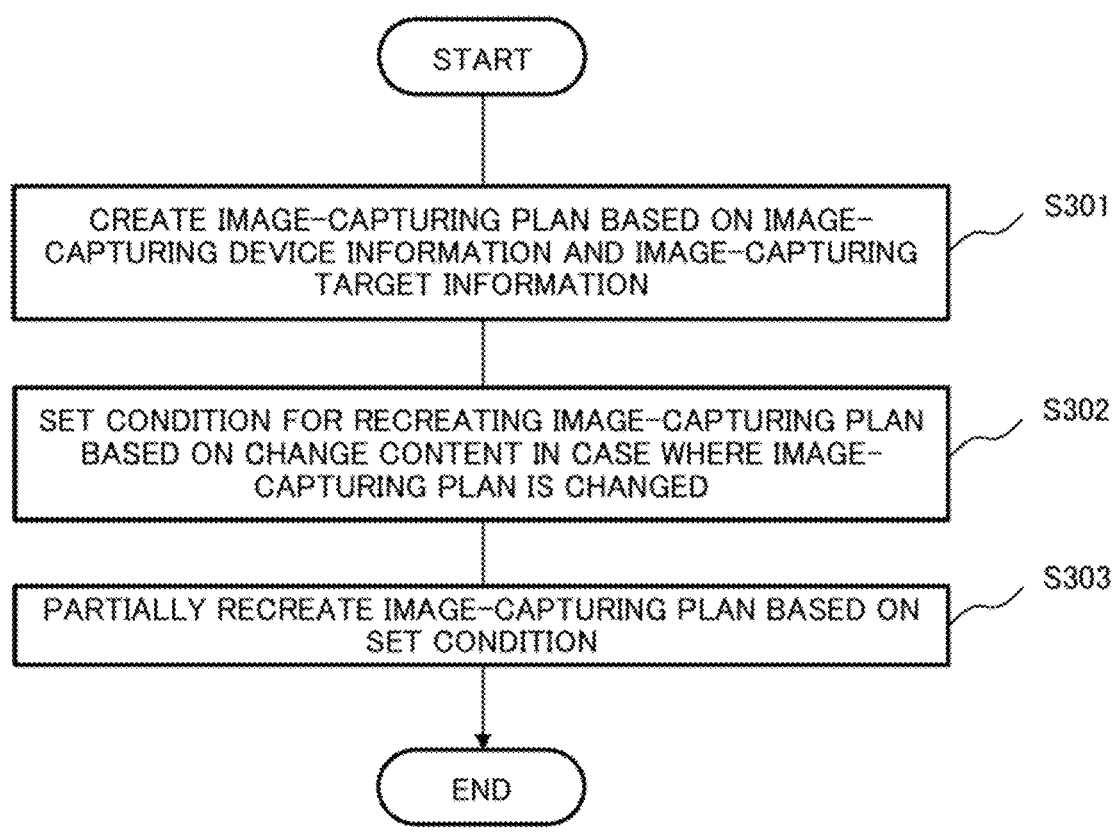
FIG. 12 is a diagram illustrating an example of an operation of the image-capturing plan creating device according to the third example embodiment.

FIG. 12 is a diagram illustrating an example of an operation of the image-capturing plan creating device according to the third example embodiment.

The image-capturing plan creating unit 106 receives the image-capturing target information and the image-capturing device information. The image-capturing plan creating unit 106 creates the image-capturing plan based on the image-capturing target information and the image-capturing device information (Step S301). In a case where the image-capturing plan is changed, the condition setting unit 105 receives the change content of the created image-capturing plan, and sets the condition for recreating parts of the created image-capturing plan based on the change content (Step S302). The image-capturing plan creating unit 106 recreates parts of the created image-capturing plan based on the set condition (Step S303).

Effects of Third Example Embodiment

With the image-capturing plan creating device 100 of the third example embodiment, it is possible to quickly create an image-capturing plan reflecting a plan change. The condition setting unit 105 sets a condition for recreating parts of the created image-capturing plan based on the change content of the created image-capturing plan. This is because the image-capturing plan creating unit 106 recreates parts of the created image-capturing plan based on the set condition.

The image-capturing plan creating devices 100 according to the first, second, and third example embodiments can be applied to support and solutions for creating an image-capturing plan for image-capturing targets (the ground surface or a target structure) by a plurality of image-capturing devices (satellite devices or drones).

Hardware Configuration

Figure 13:
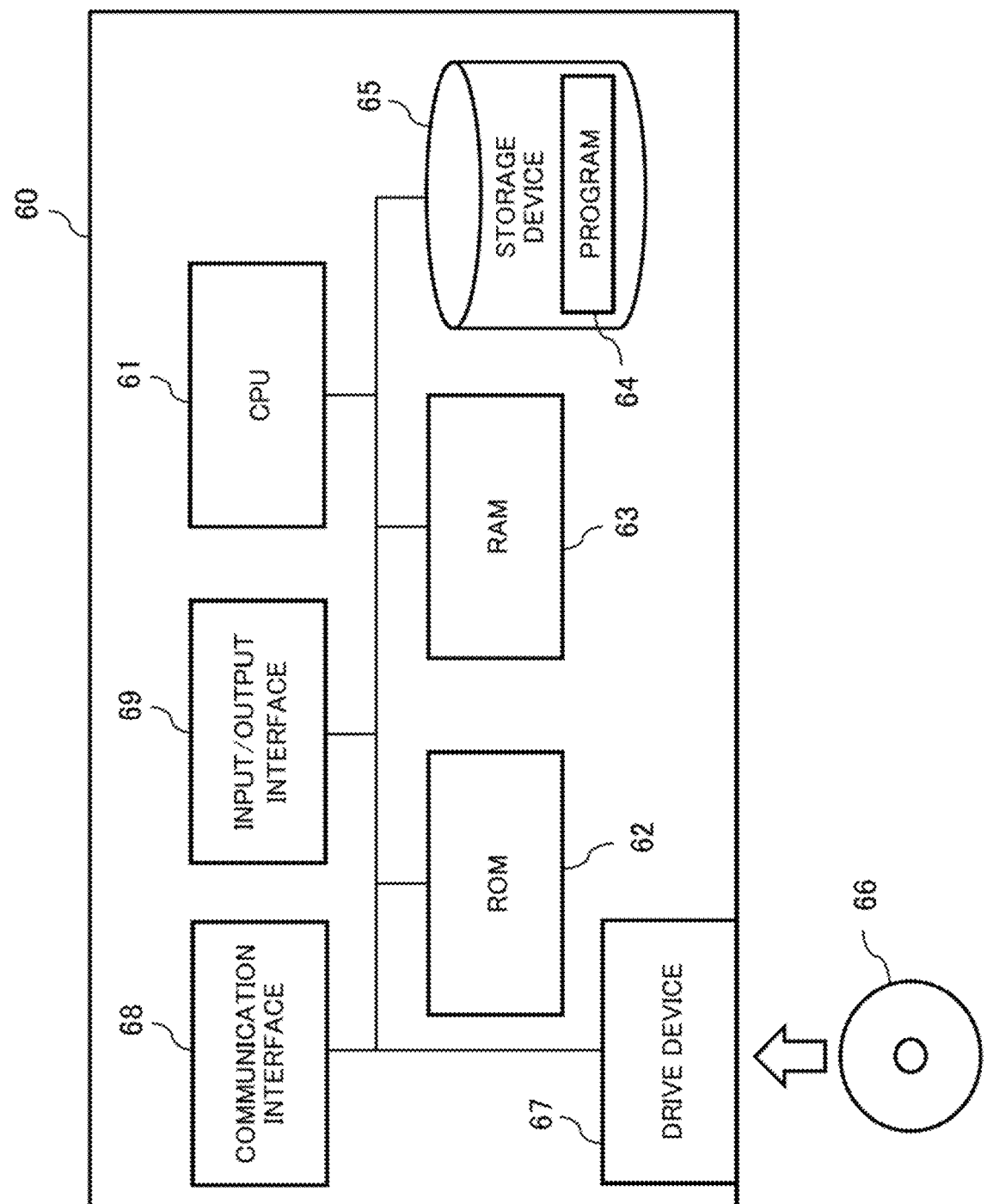
FIG. 13 is a diagram illustrating an example of a hardware configuration for implementing the image-capturing plan creating device.

FIG. 13 is a diagram illustrating an example of a hardware configuration for implementing the image-capturing plan creating device. The image-capturing plan creating device 100 is implemented by a computer 60 illustrated in FIG. 13. A central processing unit (CPU) 61 executes a function of each component of the image-capturing plan creating device 100 by a program 64, thereby implementing the image-capturing plan creating device 100. The function of each component may be implemented by the CPU 61 reading the program 64 from a read only memory (ROM) 62 or a storage device 65 and executing the read program 64 using the CPU 61 and a random access memory (RAM) 63. Examples of the components include the image-capturing plan changing unit 103, the condition setting unit 105, and the image-capturing plan creating unit 106 of the image-capturing plan creating device 100 according to the third example embodiment.

It can also be understood that the image-capturing plan creating device 100 is implemented by a computer-readable storage medium 66 storing a program for causing the CPU 61 to function as the image-capturing plan creating device 100. Examples of the storage medium 66 include a hard disk drive, a disk medium detachable from a drive device 67, a memory card, and the like. The components of the image-capturing plan changing unit 103, the condition setting unit 105, and the image-capturing plan creating unit 106 of the image-capturing plan creating device 100 may be dedicated hardware by an integrated circuit. Furthermore, the computer 60 may include a communication interface 68 connectable to a network and an input/output interface 70. The components of the image-capturing plan creating device 100 may be dispersedly arranged in a plurality of devices, and in this case, the plurality of devices are communicably connected to each other, thereby functioning similarly to a single device.

The present disclosure is not limited to the above-described example embodiments, and various modifications can be made, and example embodiments obtained by appropriately combining configurations, operations, and processing disclosed in different example embodiments are also included in the technical scope of the present disclosure.

The present disclosure has been particularly shown and described using the above-described example embodiments as exemplary examples. However, the present disclosure is not limited to the above-described example embodiments. That is, the present disclosure can apply various modes that can be understood by those skilled in the art within the scope of the present disclosure.

Some or all of the above-described example embodiments can also be described as the following Supplementary Notes, but are not limited thereto.

Supplementary Note 1

An image-capturing plan creating device including:
an image-capturing plan creating unit that creates an image-capturing plan based on image-capturing target information regarding image-capturing targets and image-capturing device information regarding an image-capturing device; and
a condition setting unit that sets a condition for recreating parts of the created image-capturing plan based on a change content of the created image-capturing plan, in which
the image-capturing plan creating unit recreates the parts of the created image-capturing plan based on the set condition.

Supplementary Note 2

The image-capturing plan creating device according to Supplementary Note 1, in which
the image-capturing plan creating unit creates the image-capturing plan by allocating the image-capturing targets to the image-capturing device based on an image-capturing time and a priority set for each of the image-capturing targets.

Supplementary Note 3

The image-capturing plan creating device according to Supplementary Note 1 or 2, in which
the change content includes an identifier of a changed image-capturing target, and a change type indicating addition, deletion, or order change of an image-capturing target.

Supplementary Note 4

The image-capturing plan creating device according to any one of Supplementary Notes 1 to 3, in which
the condition setting unit cancels image-capturing allocation of an image-capturing target within a predetermined distance from the changed image-capturing target.

Supplementary Note 5

The image-capturing plan creating device according to any one of Supplementary Notes 1 to 3, in which
the condition setting unit cancels image-capturing allocation of an image-capturing target within a predetermined time from the changed image-capturing target.

Supplementary Note 6

The image-capturing plan creating device according to any one of Supplementary Notes 1 to 3, in which
the condition setting unit cancels image-capturing allocation of an image-capturing target whose image-capturing time overlaps with that of the image-capturing target changed by the image-capturing device.

Supplementary Note 7

The image-capturing plan creating device according to any one of Supplementary Notes 1 to 6, further including
a change model generation unit that generates a change model indicating a pattern of the change content based on a change history of the change content.

Supplementary Note 8

The image-capturing plan creating device according to Supplementary Note 7, in which
the image-capturing plan creating unit creates the image-capturing plan by changing a parameter when creating the image-capturing plan based on the generated change model.

Supplementary Note 9

An image-capturing plan creating method including: creating an image-capturing plan based on image-capturing target information and image-capturing device information;
setting a condition for recreating parts of the created image-capturing plan based on a change content of the created image-capturing plan; and
recreating the parts of the created image-capturing plan based on the set condition.

Supplementary Note 10

A storage medium storing a program that causes a computer to execute:
creating an image-capturing plan based on image-capturing target information and image-capturing device information;

setting a condition for recreating parts of the created image-capturing plan based on a change content of the created image-capturing plan; and recreating the parts of the created image-capturing plan based on the set condition.

REFERENCE SIGNS LIST 101 image-capturing information retaining unit
102 change interface unit
103 image-capturing plan changing unit
104 image-capturing plan retaining unit
105 condition setting unit
106 image-capturing plan creating unit
107 change history retaining unit
108 change model generation unit
201 image-capturing device information retaining unit
202 image-capturing target information retaining unit

What is claimed is:

1. An image-capturing plan creating device comprising:
at least one memory storing instructions; and
at least one processor configured to access the at least one memory and execute the instructions to:
create an image-capturing plan based on image-capturing target information regarding image-capturing targets and image-capturing device information regarding an image-capturing device;
set a condition for recreating parts of the created image-capturing plan based on a change content of the created image-capturing plan, by canceling image-capturing allocation of an image-capturing target having an image-capturing time overlaps an image-capturing time of an image-capturing target changed by the image-capturing device according to the change content; and
recreate the parts of the created image-capturing plan based on the set condition.

2. The image-capturing plan creating device according to claim 1, wherein
the at least one processor is further configured to execute the instructions to:
create the image-capturing plan by allocating the image-capturing targets to the image-capturing device based on an image-capturing time and a priority set for each of the image-capturing targets.

3. The image-capturing plan creating device according to claim 1, wherein
the change content includes an identifier of the changed image-capturing target, and a change type indicating addition, deletion, or order change of the changed image-capturing target.

4. The image-capturing plan creating device according to claim 1, wherein
the at least one processor is further configured to execute the instructions to:
cancel image-capturing allocation of an image-capturing target within a predetermined distance from the changed image-capturing target.

5. The image-capturing plan creating device according to claim 1, wherein
the at least one processor is further configured to execute the instructions to:
cancel image-capturing allocation of an image-capturing target within a predetermined time from the changed image-capturing target.

6. The image-capturing plan creating device according to claim 1, wherein
the at least one processor is further configured to execute the instructions to:
generate a change model indicating a pattern of the change content based on a change history of the change content.

7. The image-capturing plan creating device according to claim 6, wherein
the at least one processor is further configured to execute the instructions to:
create the image-capturing plan by changing a parameter when creating the image-capturing plan based on the generated change model.

8. An image-capturing plan creating method performed by a computer and comprising:
creating an image-capturing plan based on image-capturing target information and image-capturing device information;
setting a condition for recreating parts of the created image-capturing plan based on a change content of the created image-capturing plan, by canceling image-capturing allocation of an image-capturing target having an image-capturing time overlaps an image-capturing time of an image-capturing target changed by the image-capturing device according to the change content; and
recreating the parts of the created image-capturing plan based on the set condition.

9. A non-transitory storage medium storing a program that causes a computer to execute:
creating an image-capturing plan based on image-capturing target information and image-capturing device information;
setting a condition for recreating parts of the created image-capturing plan based on a change content of the created image-capturing plan, by canceling image-capturing allocation of an image-capturing target having an image-capturing time overlaps an image-capturing time of an image-capturing target changed by the image-capturing device according to the change content; and
recreating the parts of the created image-capturing plan based on the set condition.

* * * * *